UNITED STATES PATENT OFFICE.

GEORGE H. WEBSTER, OF CHICAGO, ILLINOIS.

PROCESS OF MAKING ARTIFICIAL BUTTER.

SPECIFICATION forming part of Letters Patent No. 266,568, dated October 24, 1882.

Application filed September 30, 1882. (No specimens.)

*To all whom it may concern:*

Be it known that I, GEORGE H. WEBSTER, a citizen of the United States, residing at the city of Chicago, in the county of Cook, in the State of Illinois, have invented a certain new and useful Process for Making Artificial Butter, which is fully set forth in the following specification.

My invention relates to the manufacture of substitutes for butter; and the object of it is to provide such a substitute which shall have all the nutritive properties of butter, and in an equal degree with butter, and in addition thereto those qualities which make it acceptable to the eye and palate, and this without introducing at any stage of the manufacture any material either deleterious or unfamiliar to the stomach. I effect these objects by the improved process which I will now proceed to describe.

I take pure leaf-lard that has parted with all its animal heat and divide it minutely in a grinding or hashing apparatus. It is next heated sufficiently to liquefy the lard proper, and is then passed through a series of strainers, thereby separating the lard from the tissues intermingled with it in the leaf. It is then treated with coloring-matter such as is commonly used in the making of dairy-butter. When it has received a satisfactory color it is poured into tanks containing a strong cold brine, sufficient in quantity to immerse the lard, which is solidified almost immediately by the cold water. In this brine the lard remains for thirty-six hours, and under the operation of the brine parts with a large proportion of those elements that impart to it the characteristic flavor which makes it unacceptable to sensitive palates. After remaining in the brine thirty-six hours it is taken out and placed on tables or shelves of ash, which are kept scrupulously clean. Here it is covered with salt, and remains in this condition another thirty-six hours, the salt absorbing all that remainder of odorizing matter which was not separated by the brine, and leaving the lard free from peculiar taste or smell. The clarified lard is then heated again in suitable vessels sufficiently to liquefy it, its temperature being raised to about 130° Fahrenheit, and is then thoroughly mixed by stirring with about an equal quantity of lukewarm pure buttermilk and about one-sixth its weight of clarified tallow, a minute quantity of pepsin (about one ounce to a hundred pounds of the lard) being also added, and having the effect to separate any remainder of nitrogenous matter and leave the fats pure. The mixture having been completely effected, the liquid is left to stand long enough for the buttermilk and foreign substances to precipitate, the temperature being meanwhile maintained at a height sufficient to keep the lard liquid. The buttermilk having completely settled, the mixture of lard and tallow is dipped off and poured into a vessel containing a quantity of pure dairy-butter, about half as much, by weight, as the lard. This butter has been previously reduced by a chopping apparatus to comparatively fine particles, being warmed just enough to make this reduction practicable. With this comminuted butter the liquid compound of lard and tallow is thoroughly stirred, so as to make of the whole a semi-fluid mass of about the consistency of gruel. When the mixture is complete it is poured into a vessel containing a sufficient quantity of cold water to immerse it. Here it is thoroughly worked with the hands till it becomes of a uniform consistency, like that of soft butter, this result being promoted by the already-mentioned admixture of tallow with the lard.

The mass is then put into a butter-working apparatus, where it is salted and the water and any remains of buttermilk worked out of it in the usual way. The result is a comparatively inexpensive substance having all the nutritive properties of butter, and being at the same time perfectly sightly and palatable, and necessarily free from any admixture of deleterious matter, nothing having been put in at any point of the process but familiar food substances, except a perfectly neutral coloring, such as is an ingredient of nearly all dairy-butter, and pepsin, which is a substance native to the stomach.

What I claim as my invention, and desire to secure by Letters Patent, is—

The hereinbefore-described process of making artificial butter, which consists in minutely dividing leaf-lard, rendering and straining it, mixing a butter-coloring matter with it, immersing it for thirty-six hours in cold brine, transferring it from the brine to dry tables or shelves, and keeping it there covered with salt for thirty-six hours; then heating it to about 130° Fahrenheit and mixing it with lukewarm buttermilk, a small quantity of clarified tallow, and a minute quantity of pepsin, and allowing the mixture to settle; then transferring the liquid lard and tallow to a vessel containing comminuted butter of about half the weight of the lard, thoroughly mixing the contents of the vessel by stirring, pouring the mixture into cold water, and thoroughly working it in the usual manner, substantially as described.

GEORGE H. WEBSTER.

Witnesses:
EVERETT WILSON,
JOHN T. GELTMACHER.